(12) United States Patent  (10) Patent No.: US 9,100,526 B2
Kuroishi et al.  (45) Date of Patent: Aug. 4, 2015

(54) POWER SUPPLY CONTROL DEVICE, IMAGE PROCESSING APPARATUS, POWER SUPPLY CONTROL METHOD, AND COMPUTER READABLE MEDIUM FOR POWER CONTROL OF OBJECTS INCLUDED IN THE IMAGE PROCESSING APPARATUS

(71) Applicant: FUJI XEROX CO., LTD., Minato-ku, Tokyo (JP)

(72) Inventors: Kenji Kuroishi, Kanagawa (JP); Masafumi Ono, Kanagawa (JP); Motofumi Baba, Kanagawa (JP); Keiko Shiraishi, Kanagawa (JP); Susumu Yamashina, Kanagawa (JP); Kenta Ogata, Kanagawa (JP); Kazuhiko Narushima, Kanagawa (JP); Koichi Azuma, Kanagawa (JP); Hidenori Horie, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/898,109

(22) Filed: May 20, 2013

(65) Prior Publication Data

US 2014/0092417 A1   Apr. 3, 2014

(30) Foreign Application Priority Data

Oct. 2, 2012   (JP) .................................. 2012-220546

(51) Int. Cl.
*H04N 1/00*   (2006.01)

(52) U.S. Cl.
CPC ....... *H04N 1/00875* (2013.01); *H04N 1/00342* (2013.01); *H04N 1/00888* (2013.01); *H04N 1/00896* (2013.01); *H04N 2201/0094* (2013.01); *H04N 2201/0098* (2013.01)

(58) Field of Classification Search
None
See application file for complete search history.

(56) References Cited

U.S. PATENT DOCUMENTS

2003/0053111 A1   3/2003 Endo
2010/0150600 A1*  6/2010 Oyoshi ........................... 399/88

FOREIGN PATENT DOCUMENTS

| JP | 2002-027159 A | 1/2002 |
| JP | 2003-195986 A | 7/2003 |
| JP | 2005-043588 A | 2/2005 |
| JP | 2009-160746 A | 7/2009 |
| JP | 4454802 B2    | 4/2010 |

\* cited by examiner

*Primary Examiner* — King Poon
*Assistant Examiner* — Andrew H Lam
(74) *Attorney, Agent, or Firm* — Sughrue Mion, PLLC

(57) ABSTRACT

A power supply control device includes a monitoring controller, a moving body detector, and a power supply controller. The monitoring controller controls a processor, an interface part, and an identification information acquisition part. The moving body detector detects whether or not a moving body including a user who intends to use the processor exists within a specific region. The power supply controller individually allows objects to be controlled including the processor, the interface part, the identification information acquisition part, and the monitoring controller to enter a power supply state or a power interruption state in an independent manner, in accordance with detection information by the moving body detector, and first controls the identification information acquisition part to be shifted from the power interruption state to the power supply state in a case where all the objects to be controlled are in the power interruption state.

9 Claims, 8 Drawing Sheets

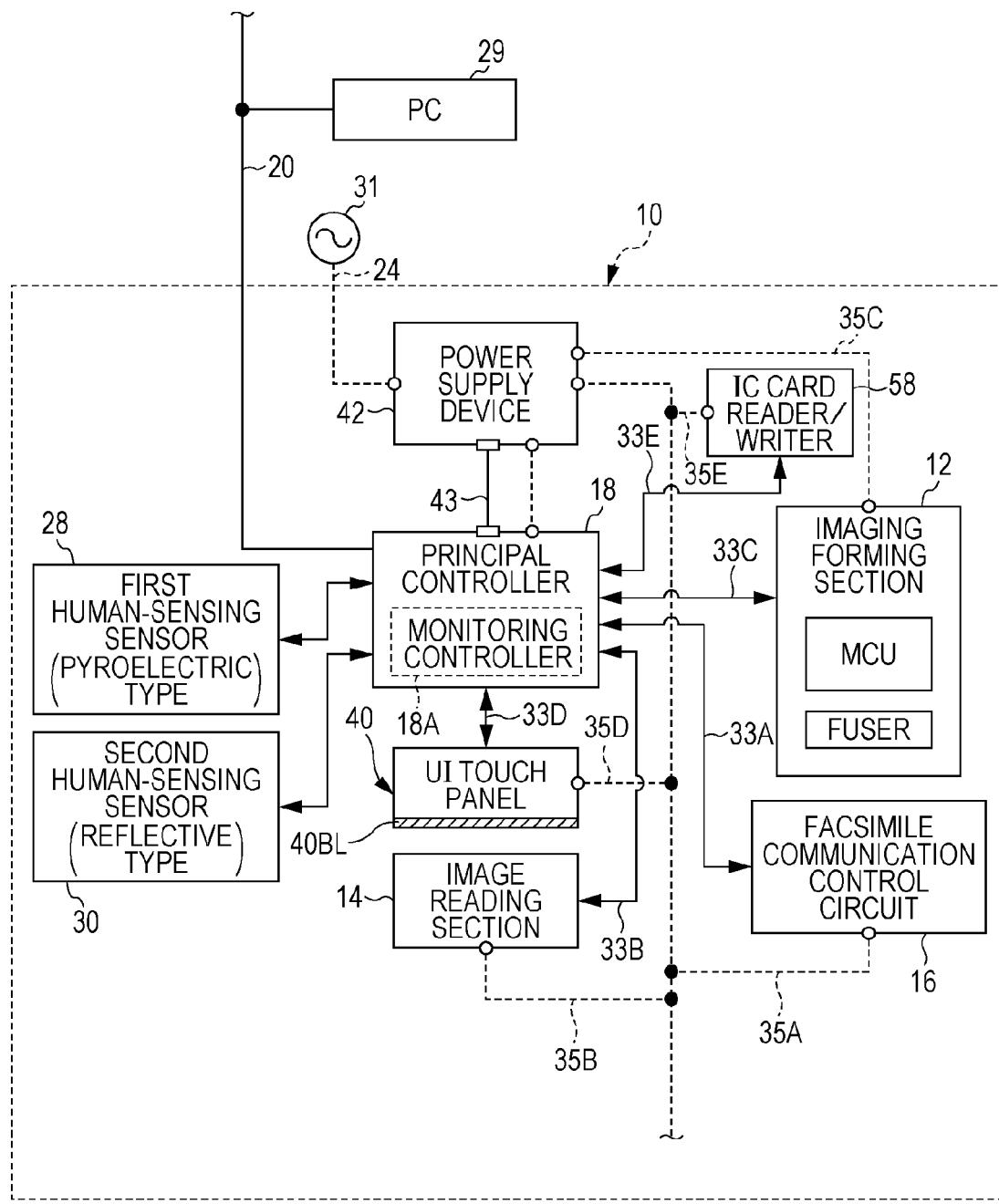

FIG. 3

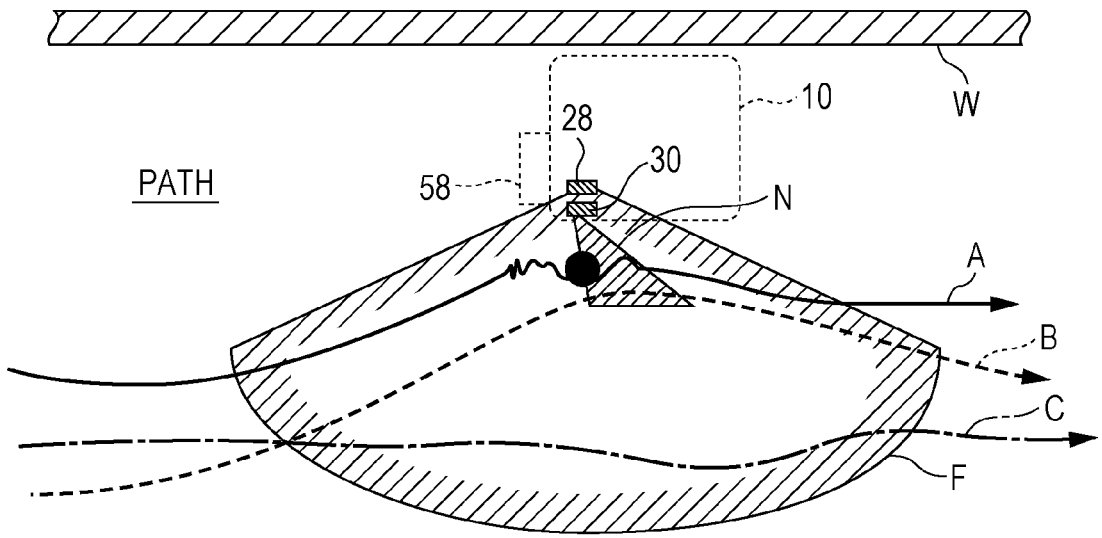

A → MOVEMENT TRAJECTORY IN WHICH A PERSON APPROACHES A POSITION AT WHICH HE/SHE IS ABLE TO OPERATE AN IMAGE PROCESSING APPARATUS, STANDS STILL TO USE THE IMAGE PROCESSING APPARATUS, AND THEN MOVES AWAY

MOVEMENT REGION
(OUTSIDE REGION → REGION F
→ REGION N → REGION F → OUTSIDE REGION)

B ---→ MOVEMENT TRAJECTORY IN WHICH A PERSON APPROACHES A POSITION AT WHICH HE/SHE IS ABLE TO OPERATE THE IMAGE PROCESSING APPARATUS AND PASSES THROUGH THE POSITION

MOVEMENT REGION
(OUTSIDE REGION → REGION F → REGION N
→ REGION F → OUTSIDE REGION)

C —·—→ MOVEMENT TRAJECTORY IN WHICH A PERSON PASSES NEAR THE IMAGE PROCESSING APPARATUS WITHOUT APPROACHING A POSITION AT WHICH HE/SHE IS ABLE TO OPERATE THE IMAGE PROCESSING APPARATUS

MOVEMENT REGION
(OUTSIDE REGION → REGION F → OUTSIDE REGION)

POWER SUPPLY CONTROL DEVICE, IMAGE PROCESSING APPARATUS, POWER SUPPLY CONTROL METHOD, AND COMPUTER READABLE MEDIUM FOR POWER CONTROL OF OBJECTS INCLUDED IN THE IMAGE PROCESSING APPARATUS

CROSS-REFERENCE TO RELATED APPLICATIONS

This application is based on and claims priority under 35 USC 119 from Japanese Patent Application No. 2012-220546 filed Oct. 2, 2012.

BACKGROUND (i) Technical Field

The present invention relates to a power supply control device, an image processing apparatus, a power supply control method, and a computer readable medium.

(ii) Related Art

For example, an image processing apparatus in a power-saving state may be returned to a normal state on the basis of authentication medium information detected when a user who intends to use the image processing apparatus holds an authentication medium (hereinafter, may be referred to as an "IC card") over an authentication medium reader/writer (hereinafter, may be referred to as an "IC card reader"), which is connected to the image processing apparatus.

SUMMARY

According to an aspect of the invention, there is provided a power supply control device including a monitoring controller, a moving body detector, and a power supply controller. The monitoring controller controls, in a cooperative manner, a processor that receives power supply and performs specific processing, an interface part that has a function of receiving operation instruction information on the processor and a function of reporting operation state information on the processor, and an identification information acquisition part that acquires identification information for identifying a user in accordance with an authentication medium. The moving body detector detects whether or not a moving body including a user who intends to use the processor exists within a specific region. The power supply controller individually allows objects to be controlled including the processor, the interface part, the identification information acquisition part, and the monitoring controller to enter a power supply state or a power interruption state in an independent manner, in accordance with detection information by the moving body detector, and first controls the identification information acquisition part to be shifted from the power interruption state to the power supply state in a case where all the objects to be controlled are in the power interruption state.

BRIEF DESCRIPTION OF THE DRAWINGS

Exemplary embodiments of the present invention will be described in detail based on the following figures, wherein:

FIG. 2 is a block diagram illustrating an example of the configuration of a control system of the image processing apparatus according to the first exemplary embodiment;

FIG. 3 is a plan view illustrating the image processing apparatus according to the first exemplary embodiment and peripheral apparatuses of the image processing apparatus;

DETAILED DESCRIPTION

First Embodiment

Figure 1:
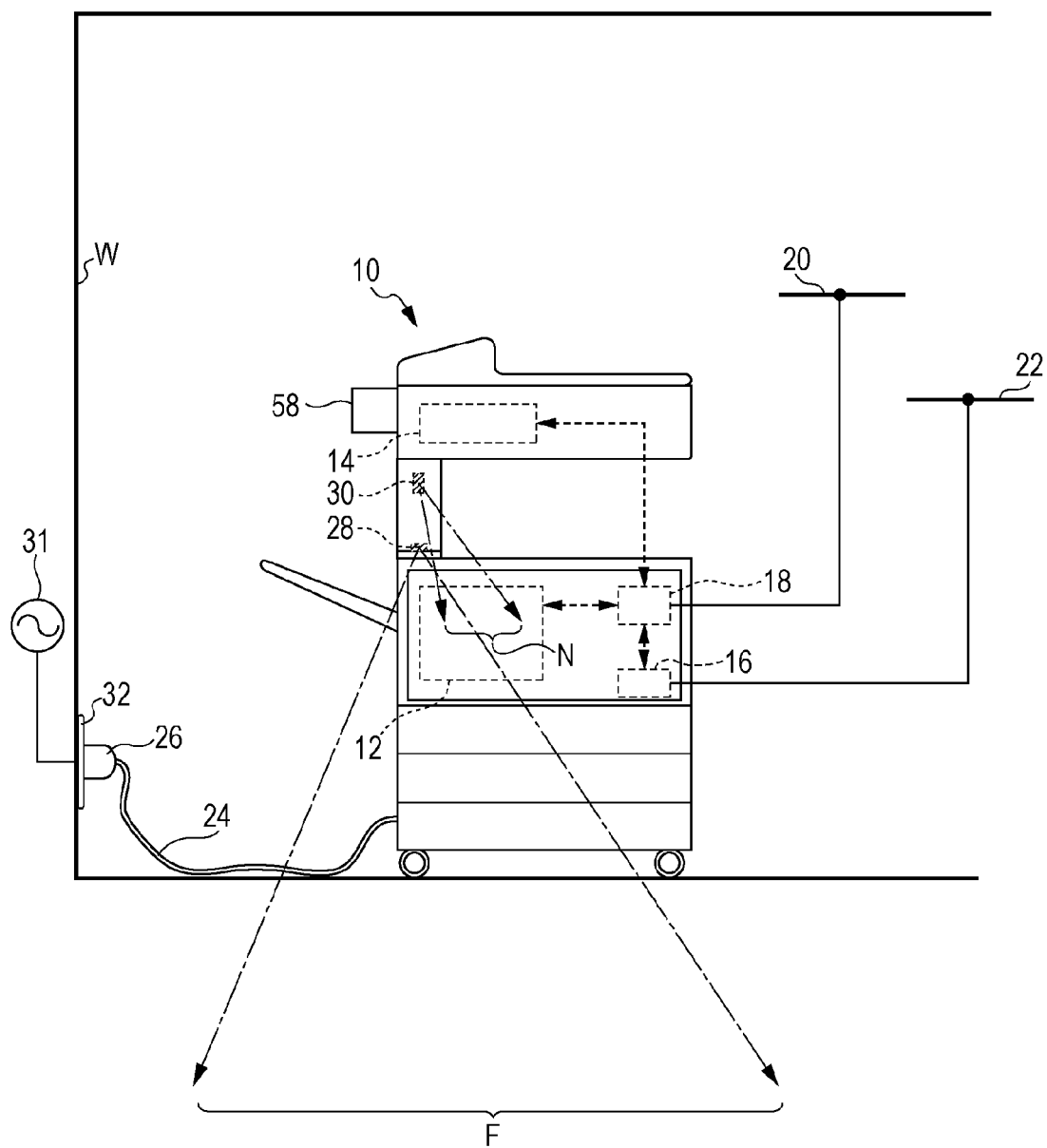
FIG. 1 is a schematic diagram illustrating an image processing apparatus according to a first exemplary embodiment of the present invention.

FIG. 1 illustrates an image processing apparatus 10 according to a first exemplary embodiment of the present invention.

The image processing apparatus 10 includes an image forming section 12 that forms an image on recording paper, an image reading section 14 that reads a document image, and a facsimile communication control circuit 16. The image processing apparatus 10 also includes a principal controller 18. The principal controller 18 controls the image forming section 12, the image reading section 14, and the facsimile communication control circuit 16 to, for example, temporarily store image data of the document image read by the image reading section 14 and send the read image data to the image forming section 12 or the facsimile communication control circuit 16.

A communication network 20 such as the Internet or the like is connected to the principal controller 18, and a telephone line 22 is connected to the facsimile communication control circuit 16. For example, the principal controller 18 is connected to a host computer via the communication network 20 to receive image data and execute facsimile transmission and reception via the facsimile communication control circuit 16 using the telephone line 22.

The image reading section 14 includes a document table for positioning a document, a scanning driving system that performs scanning of an image of the document placed on the document table to allow the image to be irradiated with light, and a photoelectric conversion element, such as a charge coupled device (CCD), that receives reflected or transmitted light by scanning by the scanning driving system to convert the light into an electric signal.

The image forming section 12 includes a photoreceptor. A charging device that uniformly charges the photoreceptor, a scanning exposure unit that performs scanning with optical beams on the basis of image data, an image developing unit that develops an electrostatic latent image formed by scanning and exposure by the scanning exposure unit, a transfer unit that transfers the developed image on the photoreceptor to recording paper, and a cleaning unit that cleans the surface of the photoreceptor after transfer is performed are arranged around the photoreceptor. Furthermore, a fixing unit that fixes the image on the recording paper after transfer is performed is arranged on a conveyance path for the recording paper.

In the image processing apparatus 10, a plug 26 is provided at the leading end of an input power line 24. When the plug 26 is plugged into a plug plate 32 for a commercial power source 31 routed to a wall surface W, the image processing apparatus 10 receives power supply from the commercial power source 31. In the image processing apparatus 10 according to the first exemplary embodiment, control for transition between a power supply mode in which power supply is received from the commercial power source 31 and a sleep mode (including power supply of 0 W) in which power supply from the commercial power source 31 is reduced to the minimum necessary. This will be explained later in more detail.

Hardware Configuration of Control System of Image Processing Apparatus

FIG. 2 is a schematic diagram illustrating an example of the hardware configuration of the image processing apparatus 10.

The communication network 20 is connected to the principal controller 18 of the image processing apparatus 10. A personal computer (terminal apparatus) 29, which may serve as a transmission source of image data or the like, is connected to the communication network 20.

The facsimile communication control circuit 16, the image reading section 14, the image forming section 12, a user interface (UI) touch panel 40, an IC card reader/writer 58 are connected to the principal controller 18 via buses 33A to 33E, respectively, such as data buses, control buses, or the like. That is, individual processing sections of the image processing apparatus 10 are principally controlled by the principal controller 18. A UI touch panel back light unit 40BL is provided at the UI touch panel 40.

The image processing apparatus 10 also includes a power supply device 42. The power supply device 42 is connected to the principal controller 18 via a signal harness 43.

The power supply device 42 receives power supply from the commercial power source 31 via the input power line 24.

For the power supply device 42, power supply lines 35A to 35E for individually supplying power to the principal controller 18, the facsimile communication control circuit 16, the image reading section 14, the image forming section 12, the UI touch panel 40, and the IC card reader/writer 58, respectively, in an independent manner are provided. Thus, the principal controller 18 allows power to be individually supplied (power supply mode) to objects (hereinafter, may be referred to as "processing sections", "devices", "modules", or the like) in an independent manner or allows power to be individually interrupted (sleep mode) in an independent manner, that is, the principal controller 18 is capable of performing so-called partial power-saving control.

Furthermore, two human-sensing sensors, a first human-sensing sensor 28 and a second human-sensing sensor 30, are connected to the principal controller 18. The first human-sensing sensor 28 and the second human-sensing sensor 30 monitor presence or absence of a person around the image processing apparatus 10.

In the first exemplary embodiment, supply or non-supply of power is realized for each processing section of the image processing apparatus 10 (partial power-saving control). Here, partial power saving for each processing section is merely an example. Control for power saving may be performed for each group including plural processing sections.

Furthermore, in the case where objects to be subjected to partial power saving include the principal controller 18 and all the processing sections are subjected to power saving, a monitoring controller 18A provided in the principal controller 18 receives the minimum necessary power and power supply to the controllers other than the monitoring controller 18A is interrupted (this state may be referred to as a "power-saving mode" or a "sleep mode").

The monitoring controller 18A may include an IC chip or the like, which is called, for example, an application specific integrated circuit (ASIC), including a central processing unit (CPU), a random access memory (RAM), a read only memory (ROM), or the like in which an operation program is stored and which is processed in accordance with the operation program.

In the case where, for example, a printing request is received from a communication line detector or a FAX reception request is received from a FAX line detector during monitoring in the power-saving state, the monitoring controller 18A supplies power to a device in the power-saving state.

Although the commercial power source 31 is used as the power supply source for the monitoring controller 18A in the first exemplary embodiment, power generated from a solar panel, a power supply unit having a power accumulating function, such as a battery, a condenser, or the like, a power generator that generates power using regenerative energy or the like may be used as a power supply source.

Figure 4:
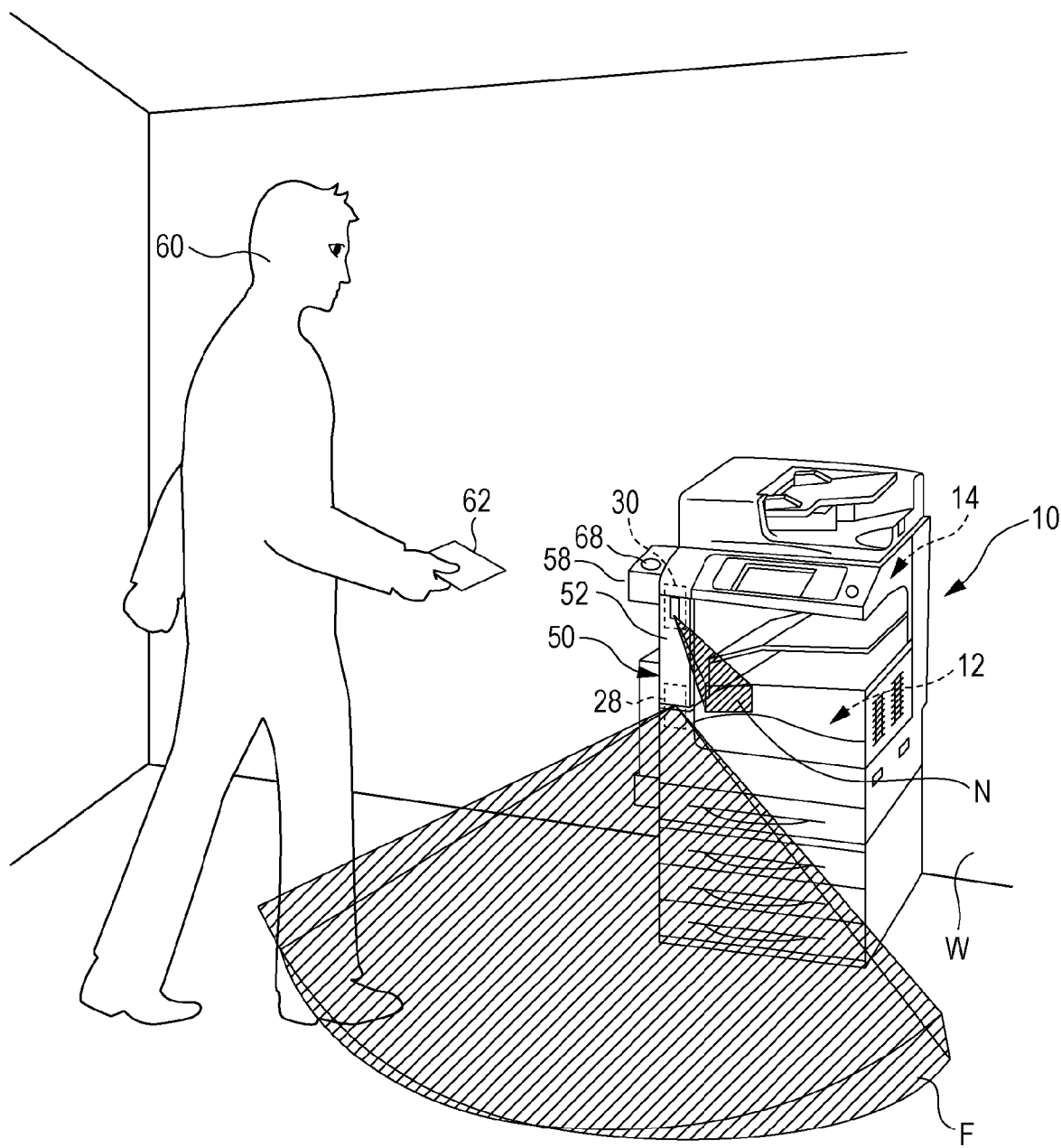
FIG. 4 is a perspective view illustrating the image processing apparatus according to the first exemplary embodiment and peripheral apparatuses of the image processing apparatus.

As illustrated in FIG. 4, the IC card reader/writer 58 has a function of transmitting information in a non-contact manner to an authentication medium (in this example, a non-contact IC card 62 is exemplified) carried by a user 60 and receiving in a non-contact manner information stored in the IC card 62.

Figure 6:
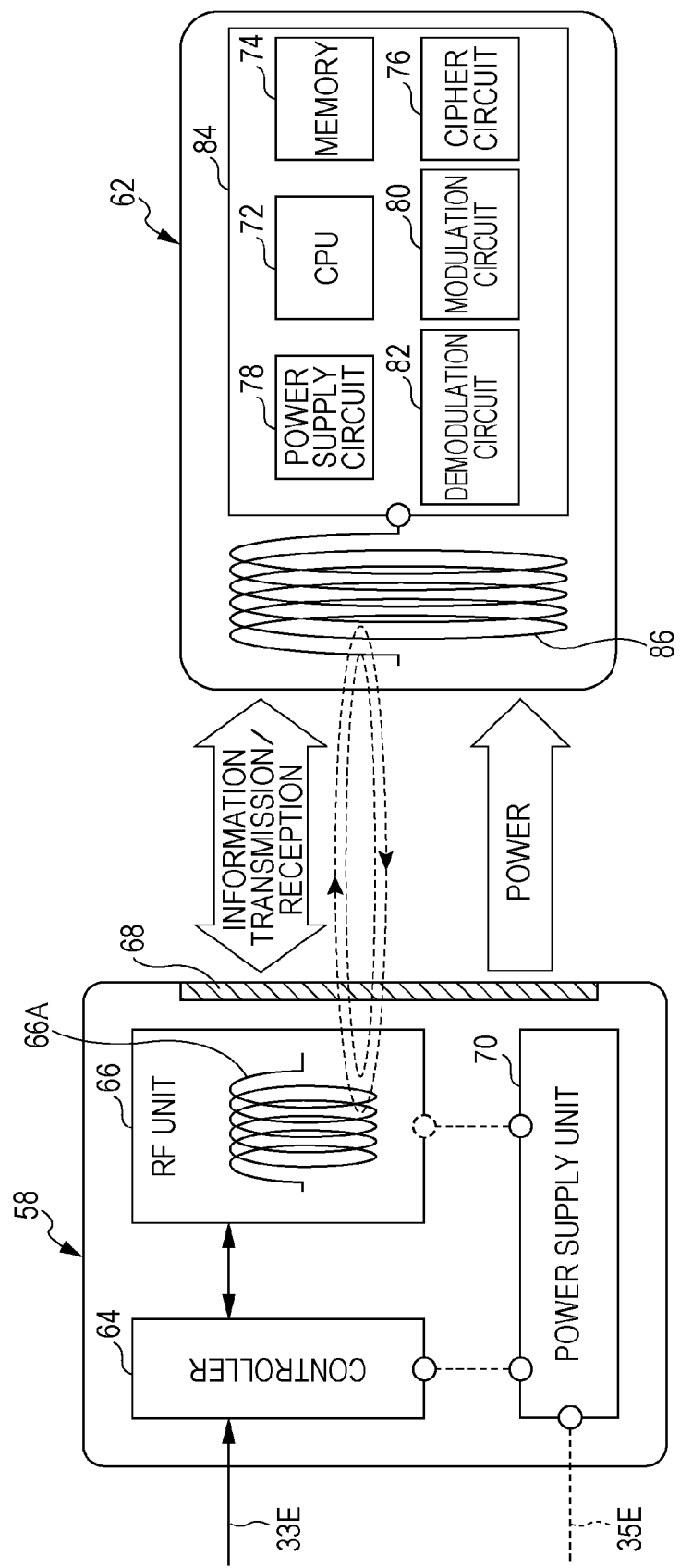
FIG. 6 is a schematic block diagram illustrating an IC card reader/writer and an IC card in the first exemplary embodiment.

As illustrated in FIG. 6, the IC card reader/writer 58 includes a controller 64 that controls operation on the basis of an upper control system (in the first exemplary embodiment, the principal controller 18 illustrated in FIG. 2), an RF unit 66 for supplying an information signal and power to the IC card 62, and a power supply unit 70 that is capable of individually supplying power to the controller 64 and the RF unit 66 in an independent manner.

A region (head portion 68) that causes electromagnetic induction between the RF unit 66 and the IC card 62 is arranged in the RF unit 66. The user 60 who carries the IC card 62 (see FIG. 4) performs a so-called operation for "holding the IC card 62" while using the head portion 68 as a guide. In the first exemplary embodiment, the operation for "holding the IC card 62" is performed in a non-contact manner. However, this operation may be performed in such a manner that information is read by contact with a magnetic strip (contact type).

Meanwhile, the IC card 62 includes an IC chip 84 including a CPU 72, a memory 74, a cipher circuit 76, a power supply circuit 78, a modulation circuit 80, and a demodulation circuit 82, and an antenna unit 86 connected to the demodulation circuit 82.

When current flows to an antenna 66A of the RF unit 66, power is supplied to the power supply circuit 78 of the IC card 62 due to electromagnetic induction, and transmission and reception of information is performed.

Function of Human-Sensing Sensor

In the case where a user stands in front of the image processing apparatus 10 during the sleep mode and then, for example, operates a power-saving control button so that power supply is resumed, a certain period of time may be taken to activate the image processing apparatus 10.

Under such circumstances, the first human-sensing sensor 28 and the second human-sensing sensor 30 are installed. In addition, in the sleep mode, the first human-sensing sensor 28 and the second human-sensing sensor 30 detect the existence of a user before the user presses the power-saving cancellation button and power supply is resumed quickly. Thus, the user is able to start to use the image processing apparatus 10 quickly.

In the first exemplary embodiment, the first human-sensing sensor 28 and the second human-sensing sensor 30 are connected to the principal controller 18. As explained later in detail, the detection threshold distance of the first human-sensing sensor 28 is longer than the detection threshold distance of the second human-sensing sensor 30 (see a first region F and a second region N in FIGS. 3 and 4).

In the sleep mode, the first human-sensing sensor 28 receives power supply from the monitoring controller 18A and monitors the movement of a moving body around the image processing apparatus 10. Linking control is performed in such a manner that detecting a moving body by the first human-sensing sensor 28 starts power supply to the second human-sensing sensor 30, which is in a power interruption state during the sleep mode.

The image processing apparatus 10 includes an existing power-saving control button (not illustrated). A user is able to give an instruction for power-saving or an instruction for cancellation of power-saving by a manual operation. In the image processing apparatus 10, all the power-saving control button and the first and second human-sensing sensors 28 and 30 are used. However, monitoring may be performed only by the first human-sensing sensor 28 and the second human-sensing sensor 30.

The first human-sensing sensor 28 and the second human-sensing sensor 30 are "human-sensing" sensors. However, the "human-sensing" sensor is a unique name according to the first exemplary embodiment, and the first human-sensing sensor 28 and the second human-sensing sensor 30 may be sensors of any type as long as they are capable of sensing (detecting) at least a person. In other words, a sensor that is capable of sensing (detecting) a moving body that is not a person may also be used. Thus, hereinafter, a "person" may be mentioned as an object to be detected by the first human-sensing sensor 28 and the second human-sensing sensor 30. However, in the future, a robot or the like as well as a person will be an object to be sensed. Meanwhile, in the case where a special sensor that is capable of sensing a person in an identifying manner exists, the special sensor may be applied to the first human-sensing sensor 28 and the second human-sensing sensor 30. Hereinafter, a moving body, a person, a user, and the like are synonymous with one another as objects to be detected by the first human-sensing sensor 28 and the second human-sensing sensor 30 and are distinguished from one another where necessary.

First Human-Sensing Sensor

Regarding the specifications of the first human-sensing sensor 28 used in the first exemplary embodiment, the first human-sensing sensor 28 detects the movement of a moving body around the image processing apparatus 10 (for example, the range of 0 m to 5 m). In this case, an infrared sensor or the like using the pyroelectric effect of a pyroelectric element (a pyroelectric sensor) is typically used as the first human-sensing sensor 28. In the first exemplary embodiment, a pyroelectric sensor is used as the first human-sensing sensor 28. For example, when the amount of a change of the temperature of a detection range exceeds a specific threshold, a binary signal serving as an output signal is inverted.

The major characteristic of the sensor using the pyroelectric effect of a pyroelectric element applied to the first human-sensing sensor 28 is a wide detection region. Furthermore, since the sensor senses the movement of a moving body, in the case where a person stands still within a detection region, the existence of the person is not detected due to no-change in the temperature. For example, in the case where a high-level signal is output while a person is moving, when the person within the detection range stops movement, the signal is turned into a low-level signal.

The term "stop movement" in the first exemplary embodiment obviously includes complete stillness like a still image captured with a still camera or the like. However, for example, the case where a person stops in front of the image processing apparatus 10 in order to operate the image processing apparatus 10 is also included. Thus, slight movement within a specific range (movement accompanied with respiration or the like) and the case where a limb, a neck, or the like moves are included within the scope of stopping movement.

However, in the case where a person performs stretching or the like while the person is waiting for processing, such as, for example, image formation or image reading, in front of the image processing apparatus 10, the first human-sensing sensor 28 may detect the existence of the person.

Thus, instead of defining the "stop movement" and setting a threshold for detection of movement by the first human-sensing sensor 28, a relatively rough and standard threshold may be set and the threshold may depend on the detection state of the first human-sensing sensor 28, based on the environment (temperature, humidity, and the like). That is, in an apparatus installation place, a threshold may be set experimentally or statistically in such a manner that it is determined that a person is moving in the case where the first human-sensing sensor 28 outputs one of binary signals (for example, a high-level signal) and it is determined that the person stops movement in the case where the person exists within the detection region of the first human-sensing sensor 28 and the other one of the binary signals (for example, a low-level signal) is output.

Second Human-Sensing Sensor

Meanwhile, regarding the specifications of the second human-sensing sensor 30 used in the first exemplary embodiment, a sensor that detects the presence or absence (existence or non-existence) of a moving body is applied to the second human-sensing sensor 30. A reflective sensor or the like including a projector and a light receiver (reflective sensor) is typically used as the sensor applied to the second human-sensing sensor 30. Here, the projector and the light receiver may be separated from each other.

The major characteristic of the reflective sensor or the like applied to the second human-sensing sensor 30 is that the presence or absence of a moving body is accurately detected in accordance with shielding or non-shielding of light coming to the light receiver. Furthermore, since the amount of light incident to the light receiver is limited by the amount of light projected by the projector, a relatively narrow range is set as the detection region.

The first human-sensing sensor 28 and the second human-sensing sensor 30 are not limited to a pyroelectric sensor and a reflective sensor, respectively, as long as the first human-sensing sensor 28 and the first human-sensing sensor 28 are capable of achieving the functions described below.

Here, in the first exemplary embodiment, the maximum detection ranges (for example, the first region F and the second region N in FIGS. 3 and 4) are set by the first human-sensing sensor 28 and the second human-sensing sensor 30. In this example, these regions overlap. However, the regions do not necessarily overlap as long as the outer peripheral boundary line (detection threshold distance) of the first region F is set to be longer than the outer peripheral boundary line (detection threshold distance) of the second region N.

That is, the first region F (may be simply referred to as a "region F") illustrated in FIGS. 3 and 4, which is a relatively remote detection region, is a detection region by the first human-sensing sensor 28 and has a function as a moving body detector for a relatively remote moving body. Furthermore, the second region N (may be simply referred to as a "region N") illustrated in FIGS. 3 and 4, which is a relatively close detection region, is a detection region by the second human-sensing sensor 30 and has a function as a moving body detector for a relatively close moving body.

Although depending on the environment of the place where the image processing apparatus 10 is installed, it is desirable that the detection region of the first human-sensing sensor 28 (see the first region F illustrated in FIGS. 3 and 4) has a detection threshold distance (the furthermost position) of about 0.8 m to about 3 m. Meanwhile, the detection region of the second human-sensing sensor 30 (see the second region N illustrated in FIGS. 3 and 4) is a range in which the operation on the UI touch panel 40 and a hard key of the image processing apparatus 10 is capable of being performed and it is desirable that the detection region has a detection threshold distance (the furthermost position) of about 0.2 m to about 1.0 m. Furthermore, obviously, setting is performed such that the threshold point of the first human-sensing sensor 28 is farther than the threshold point of the second human-sensing sensor 30 after both the detection threshold distances are set.

Figure 5:
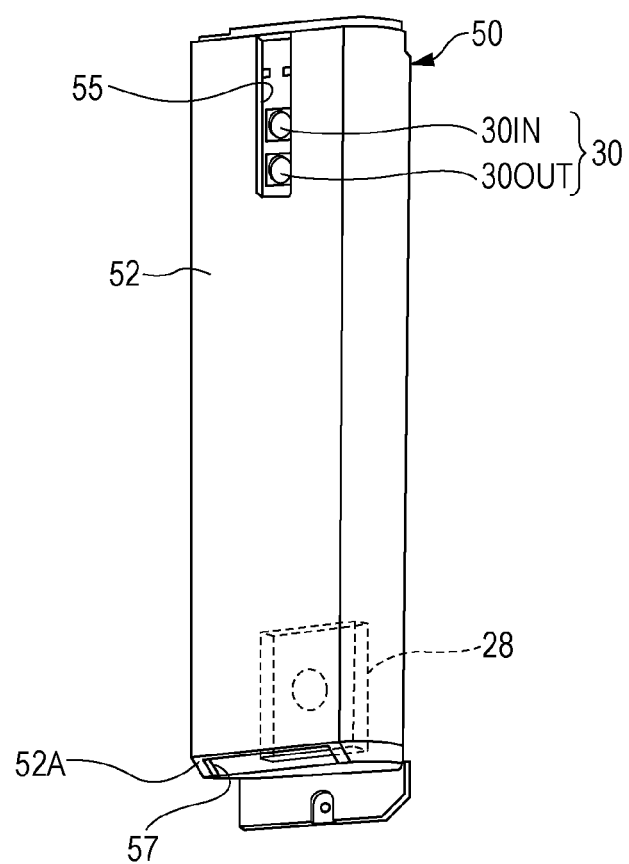
FIG. 5 is a perspective view of a covering member arranged on the front surface of a pillar part in the first exemplary embodiment.

Configuration of First Human-Sensing Sensor, Second Human-Sensing Sensor, and Peripheral Devices In the image processing apparatus 10, as illustrated in FIG. 1, the image reading section 14, the image forming section 12, and the like are covered with a housing, and the first human-sensing sensor 28 (including the second human-sensing sensor 30) is provided at a pillar part 50 having a vertically long rectangular shape in the housing. The pillar part 50 is arranged in a pillar shape in a portion where an upper housing that principally covers the image reading section 14 and a lower housing that principally covers the image forming section 12 are connected to each other. A recording paper conveyance system and the like (not illustrated) are built in the pillar part 50. FIG. 5 is an enlarged diagram illustrating the pillar part 50.

As illustrated in FIG. 5, a covering member 52 of a vertically long rectangular shape that coats, with a designed element, the pillar part 50 is arranged on the front surface of the pillar part 50.

As illustrated in FIG. 5, a vertically long slit hole 55 is arranged in an upper end portion of the covering member 52. A light receiver 30IN and a projector 30OUT of the second human-sensing sensor 30 are arranged at the back side of the slit hole 55. Although not illustrated, a dimming member having a relatively low transmittance (a transmittance of 50% or less) is embedded in the slit hole 55. This concealing member is arranged so that the second human-sensing sensor 30 is made difficult to see from the outside to secure the designed element, and the detection function of the second human-sensing sensor 30 is basically maintained.

A gap is arranged between the lower surface of the covering member 52 and the upper surface of the lower housing. Furthermore, the lower end portion of the covering member 52 has a so-called chamfered shape, and a through hole 57 is arranged in the chamfer surface.

The first human-sensing sensor 28 is arranged at the back side of the through hole 57 (the back side of the covering member 52). Thus, the through hole 57 serves as an observation window for detecting a moving body with the first human-sensing sensor 28. Hereinafter, the through hole 57 may be referred to as an observation window 57.

Here, since the observation window 57 is formed in a chamfered portion 52A, the observation window 57 is difficult to see from the front side of the apparatus compared to the case where the observation window 57 is provided on the front side. Thus, the observation window 57 has a structure not impairing the designed element of the covering member 52.

Sensor Power Supply Control

In the first exemplary embodiment, the second human-sensing sensor 30 does not always receive power supply. At the point in time when a moving body (user) enters the first region F illustrated in FIG. 3 that is controlled by the first human-sensing sensor 28, which receives power supply from the monitoring controller 18A even in the sleep mode, the second human-sensing sensor 30 receives power supply and starts to perform operation. Then, at the point in time when the moving body (user) enters the second region N illustrated in FIG. 3 controlled by the second human-sensing sensor 30, an activation instruction for shifting from the sleep mode to the standby mode is issued to the individual processing sections.

That is, by cooperation between the two human-sensing sensors (the first human-sensing sensor 28 and the second human-sensing sensor 30) having different detection regions, the minimum necessary power supply is received.

As illustrated in FIG. 3, the relationship between the moving body (user 60) and the image processing apparatus 10 is roughly classified into three forms. In the first form, the person approaches a position at which he/she is able to operate the image processing apparatus 10 in order to use the image processing apparatus 10 (see movement represented by an A-line view in FIG. 3 (pattern A)). In the second form, the person approaches the position at which he/she is able to operate the image processing apparatus 10 without a purpose of using the image processing apparatus 10 (see movement represented by a B-line view in FIG. 3 (pattern B)). In the third form, the person reaches a range in which the user may enter the first form or the second form although not approaching the position at which he/she is able to operate the image processing apparatus 10 (see movement represented by a C-line view in FIG. 3 (pattern C)).

In the first exemplary embodiment, the power supply period and the power interruption period for the second human-sensing sensor 30 according to the movement (movement forms of a person based on the pattern A to the pattern C illustrated in FIG. 3) are controlled on the basis of detection information by the first human-sensing sensor 28 and detection information by the first human-sensing sensor 28 and the second human-sensing sensor 30.

Furthermore, in the first exemplary embodiment, power supply control for the IC card reader/writer 58 is first performed on the basis of detection information by the first human-sensing sensor 28 and the second human-sensing sensor 30. That is, this is because a user who intends to use the image processing apparatus 10 first holds the IC card 62 carried by the user over the head portion 68 of the IC card reader/writer 58 to receive authentication.

Thus, in the power supply control in the first exemplary embodiment for shifting from the sleep mode to the power supply mode, stepwise control is performed in such a manner that power is first supplied to the IC card reader/writer 58 and power supply to other devices, such as the principal controller 18, is then performed in accordance with the situation. Obviously, in the case of a mode not requiring authentication, power supply control for the IC card reader/writer 58 is omitted.

In the first exemplary embodiment, partial power saving control for a device is also performed. Thus, for transition from the sleep mode (excluding a remote instruction for printing), in order to smoothly deal with an operation performed by an approaching user, power is supplied to the UI touch panel 40. Then, on the basis of information on an operation on the UI touch panel 40 performed by the user, power is supplied to a required device. For example, in the case of an image reading job, power is supplied to the image reading section 14. In the case of a copying job, power is supplied to the image reading section 14 and the image forming section 12.

In the first exemplary embodiment, the stepwise control from the sleep mode to power supply to the UI touch panel 40 is performed as described below. At least control at stage 1 and stage 2 is performed by the monitoring controller 18A.
(Stage 1)

By detecting a moving body (user) by the first human-sensing sensor 28, power is supplied to the second human-sensing sensor 30, and at the same time, power is supplied to both the controller 64 and the RF unit 66 of the IC card reader/writer 58.
(Stage 2)

Power is supplied to the principal controller 18.
(Stage 3)

A communication protocol for transmitting and receiving identification information, which is read from the IC card 62, to and from the controller 64 of the IC card reader/writer 58 and the principal controller 18 is established.
(Stage 4)

Upon the IC card 62 being held over the RF unit 66 of the IC card reader/writer 58, identification information is read and authentication processing by the principal controller 18 is performed.
(Stage 5)

By detecting the user by the second human-sensing sensor 30, power is supplied to the UI touch panel 40.

Hereinafter, operation in the first exemplary embodiment will be explained.

Example of Transition of Modes in Power Supply Control in Image Processing Apparatus When no processing is performed in the image processing apparatus 10, the operation state of the image processing apparatus 10 is set to the sleep mode. During the sleep mode, minimum necessary power is supplied to the monitoring controller 18A and the first human-sensing sensor 28, and movement (entry) of a moving body is monitored in the first region F illustrated in FIGS. 3 and 4. When a moving body is detected in the first region F, power supply to the second human-sensing sensor 30 starts, and entry of the moving body (user) is monitored in the second region N illustrated in FIGS. 3 and 4.

Here, with a trigger for starting-up (acquisition of authentication information from the IC card 62 by the IC card reader/writer 58, detection of a starting-up trigger, such as detection of a user by the second human-sensing sensor 30, an operation for a power-saving control button, or the like), the operation state enters a warm-up mode (warm-up operation) mode.

A mode in which the amount of power supply is increased compared to the power supply in the original sleep mode by activation of the principal controller 18 and the UI touch panel 40 may be provided after the trigger for starting-up. This mode may still be defined as a sleep mode or may be defined as a different mode.

Furthermore, after the trigger for starting-up, for example, the operation state returns to a mode in which a job is capable of being selected (activation (power supply to) of the touch panel 40), and the device to be activated is determined on the basis of a selected job. In the case where the type of a job is image reading or the like, if the image forming section 12 is not activated, warm-up may not be performed (partial power-saving control).

The above-mentioned warm-up mode is warm-up operation for allowing the image processing apparatus 10 (principally, the temperature of the fixing unit of the image forming section 12) to quickly enter the state in which processing is capable of being performed. In the warm-up mode, the maximum power is consumed among various modes. For example, in the first exemplary embodiment, an IH heater is used as a heater in the fixing unit. The warm-up mode time in the case of using an IH heater is relatively shorter than the warm-up mode time in a comparative example in which a halogen lamp is used as a heater. Both an IH heater and a halogen lamp may be used as IH heaters. Here, warm-up operation is the mode in which the maximum power is consumed (for example, 1200 W).

After the warm-up mode ends, the operation state of the image processing apparatus 10 enters the standby mode.

The standby mode is a mode in which "preparation for an event is completed", as literally represented. In the image processing apparatus 10, the standby mode is a state in which operation for image processing is capable of being performed immediately.

Thus, when a job execution operation is performed as key input, the operation state of the image processing apparatus 10 enters a running mode, in which image processing based on an instructed job is performed.

After image processing is completed (in the case where plural consecutive jobs are waiting to be processed, after all the consecutive jobs are completed), a waiting trigger causes the operation state of the image processing apparatus 10 to enter the standby mode. Here, after image processing is performed, clocking by a timer function may start. After a specific period of time has passed, a waiting trigger may be output, and the operation state may enter the standby mode.

In the case where a job execution instruction is issued in the standby mode, the operation state is shifted again to the running mode. Then, when a trigger for falling is detected or a specific period of time has passed, the operation state enters the sleep mode. Here, as the trigger for falling, for example, signals based on detection results by the first human-sensing sensor 28 and the second human-sensing sensor 30, a timer function, or both the signals and the timer function may be used.

Furthermore, the entire transition of modes in the actual operation in the image processing apparatus 10 does not proceed in a chronological order in accordance with a single timing chart. For example, processing may be canceled in the standby mode after the warm-up mode, and the operation state may enter the sleep mode.

As described above, the image processing apparatus 10 according to the first exemplary embodiment is shifted among various modes, and the amount of consumed power is different from mode to mode.

Furthermore, in the first exemplary embodiment, since power supply control is performed for each device, for example, a so-called partial power saving is capable of being performed in which in the case where an instruction for an image reading job is issued in the sleep mode, power is supplied to the image reading section 14 without power being supplied to the image forming section 12.

Monitoring in Sleep Mode

In the first exemplary embodiment, basically, in the sleep mode, power supply is received only by the first human-sensing sensor 28, so that an approaching state of a moving body is monitored. The region to be monitored corresponds to the first region F illustrated in FIGS. 3 and 4. By analyzing an electric signal (the amount of change) based on infrared rays input to the detector of the first human-sensing sensor 28, the presence or absence of a moving body is detected.

When a moving body is detected by the first human-sensing sensor 28 (detection of a moving body within the first region F illustrated in FIGS. 3 and 4), power supply to the second human-sensing sensor 30 starts.

Meanwhile, in the first exemplary embodiment, when a moving body is detected by the first human-sensing sensor 28 (detection of a moving body within the first region F illustrated in FIGS. 3 and 4), power is supplied to both the controller 64 and the RF unit 66 of the IC card reader/writer 58 as well as the principal controller 18. Then, on the basis of monitoring by the second human-sensing sensor 30, control for transition of modes is performed.

Figure 7:
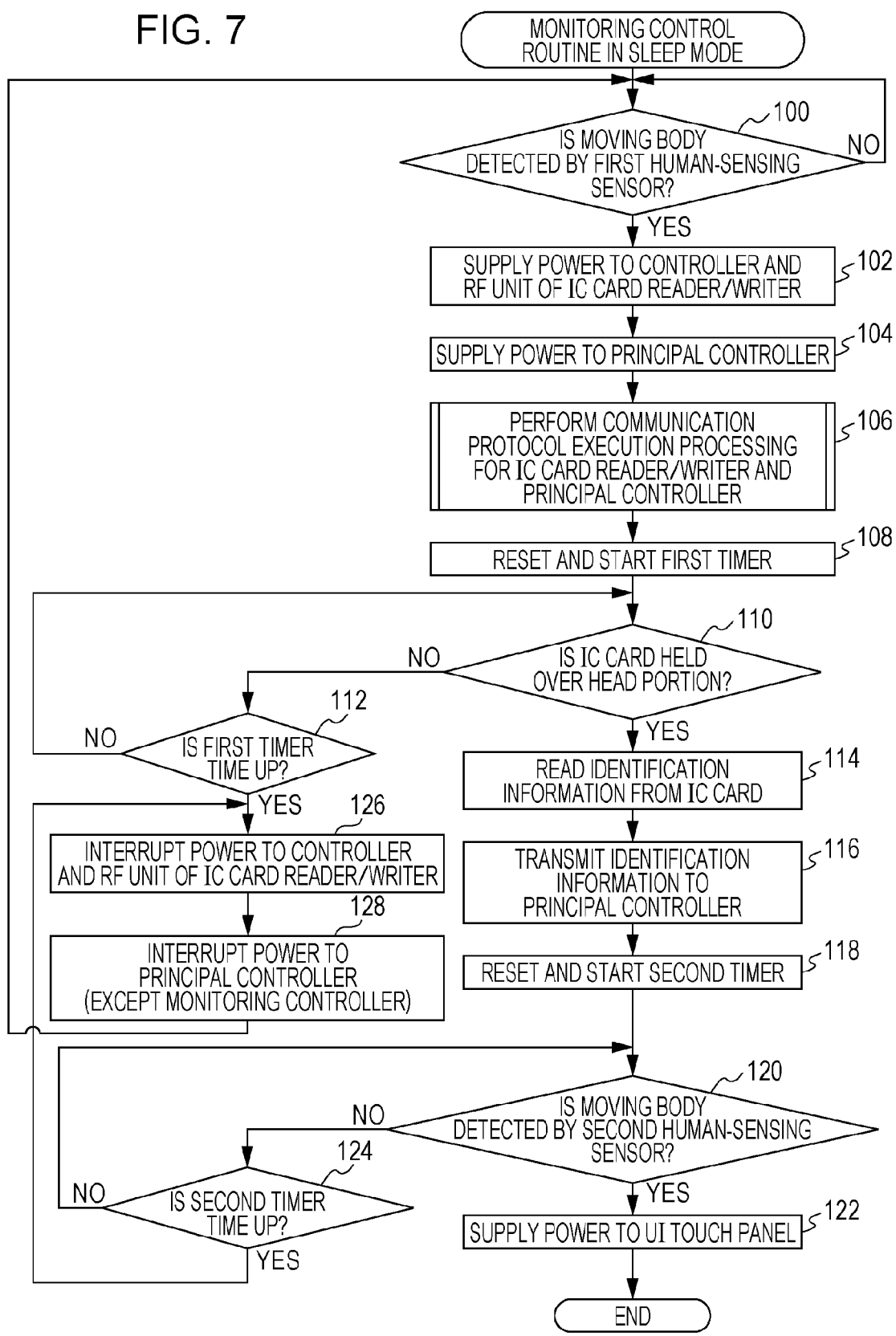
FIG. 7 is a flowchart illustrating a monitoring control routine in a sleep mode in the first exemplary embodiment.

FIG. 7 is a flowchart illustrating the flow of the process of power supply control in the first exemplary embodiment from the sleep mode to power supply to the principal controller 18 and then to power supply to the UI touch panel 40.

In step 100, it is determined whether or not a moving body is detected by the first human-sensing sensor 28. In the case where an affirmative determination is made, the process proceeds to step 102, in which power is supplied to both the controller 64 and the RF unit 66 of the IC card reader/writer 58.

In step 104, power is supplied in such a manner that all the functions of the principal controller 18, in which only the monitoring controller 18A is operating, are capable of operating, and the process proceeds to step 106.

In step 106, processing for establishing a communication protocol is performed in such a manner that transmission and reception of identification information to and from the IC card reader/writer 58 and the principal controller 18 is capable of being performed. Then, the process proceeds to step 108, in which a first timer is reset and started. For example, a clock function of the controller 64 of the IC card reader/writer 58 may be used as the first timer.

In step 110, it is determined whether or not the IC card 62 is "held over" the head portion 68 of the IC card reader/writer 58.

In the case where a negative determination is made in step 110, the process proceeds to step 112, in which it is determined whether or not the first timer is time up. In the case where a negative determination is made in both steps 110 and 112, processing in steps 110 and 112 is repeated until an affirmative determination is made in any of steps 110 and 112.

Here, in the case where an affirmative determination is made in step 110, it is determined that the user 60 intends to receive authentication of the IC card 62 in order to use the image processing apparatus 10. Then, the process proceeds to step 114, in which identification information is read from the IC card 62. Then, the process proceeds to step 116, in which the read identification information is transmitted to the principal controller 18. Then, the process proceeds to step 118.

In step 118, a second timer is reset and started. For example, a clock function of the controller 64 of the IC card reader/writer 58 or a clock function of the principal controller 18 may be applied to the second timer.

In step 120, it is determined whether or not a moving body (user 60) is detected by the second human-sensing sensor 30. The time when the IC card 62 is held over the head portion 68 of the IC card reader/writer 58 and the time when the user 60 is detected by the second human-sensing sensor 30 may be the same. However, depending on the relative positional relationship between the direction of the detection region by the second human-sensing sensor 30 (the second region N illustrated in FIGS. 3 and 4) and the installation position of the IC card reader/writer 58, the time when the IC card 62 is held over the head portion 68 of the IC card reader/writer 58 may not be the same as the time when the user 60 is detected by the second human-sensing sensor 30.

In the case where an affirmative determination is made in step 120, it is ensured that the user 60 intends to use the image processing apparatus 10. Thus, the process proceeds to step 122, in which power is supplied to the UI touch panel 40. Then, the monitoring control routine in the sleep mode is terminated.

In the case where a negative determination is made in step 120, the process proceeds to step 124, in which it is determined whether or not the second timer is time up. In the case where a negative determination is made in both steps 120 and 124, processing in steps 120 and 124 is repeated until an affirmative determination is made in any of steps 120 and 124.

Here, in the case where an affirmative determination is made in step 124, it is determined that the user 60 or the like has performed an operation for holding the IC card 62 over the head portion 68 of the IC card reader/writer 58 but has not faced the UI touch panel 40, for example, the user 60 has issued a remote instruction for printing and come to receive printing. Then, the process proceeds to step 126.

Meanwhile, in the case where an affirmative determination is made in step 112, even when it is determined that, for example, the moving body detected by the first human-sensing sensor 28 has passed by the image processing apparatus 10 (it is determined that the moving body is not the user 60), the process proceeds to step 126.

In step 126, power supply to the controller 64 and the RF unit 66 of the IC card reader/writer 58 is interrupted. Then, the process proceeds to step 128, in which power supply to the principal controller 18 is interrupted. Thus, the process returns to step 100 to return to the initial state of the sleep mode. Then, the above-described processing is repeatedly performed. Here, power continues to be supplied to the monitoring controller 18A in the principal controller 18.

Second Exemplary Embodiment

Hereinafter, a second exemplary embodiment of the present invention will be described. Since the basic configuration in the second exemplary embodiment is the same as the basic configuration explained in the first exemplary embodiment and illustrated in FIGS. 1 to 6, the explanation of the basic configuration in the second exemplary embodiment will be omitted.

The second exemplary embodiment is characterized in that power supply to the IC card reader/writer 58 is subdivided.

In the second exemplary embodiment, when a moving body is detected by the first human-sensing sensor 28 (detection of a moving body within the region F illustrated in FIGS. 3 and 4), power is supplied to the controller 64 of the IC card reader/writer 58, without power being supplied to the RF unit 66. Then, on the basis of monitoring by the second human-sensing sensor 30, control for transition of modes is performed.

That is, in order that the IC card reader/writer 58 acquires authentication information from the IC card 62, power needs to be supplied to the principal controller 18 as well as the IC card reader/writer 58 (the controller 64 and the RF unit 66). However, in order to activate the controller 64 of the IC card reader/writer 58 to establish a communication protocol with the principal controller 18, power is not necessarily supplied to the RF unit 66.

In the second exemplary embodiment, by focusing on partial power supply control for the IC card reader/writer 58, power consumption by the IC card reader/writer 58 in the sleep mode is further reduced compared to the first exemplary embodiment.

Stepwise control from the sleep mode to power supply to the UI touch panel 40 in the second exemplary embodiment is performed as described below. Here, at least control at stages 1 and 2 is performed by the monitoring controller 18A.
(Stage 1)
By detecting a moving body (user) by the first human-sensing sensor 28, power is supplied to the controller 64 of the IC card reader/writer 58 as well as the second human-sensing sensor 30. Power is not supplied to the RF unit 66.
(Stage 2)
By detecting the user by the second human-sensing sensor 30, power is supplied to the principal controller 18.
(Stage 3)
A communication protocol for transmitting and receiving identification information, which is read from the IC card 62, to and from the controller 64 of the IC card reader/writer 58 and the principal controller 18 is established.
(Stage 4)
Power is supplied to the RF unit 66 of the IC card reader/writer 58.
(Stage 5)
Upon the IC card 62 being held over the RF unit 66 of the IC card reader/writer 58, identification information is read. Authentication processing is performed by the principal controller 18. After authentication is successfully performed, power is supplied to the UI touch panel 40.

Figure 8:
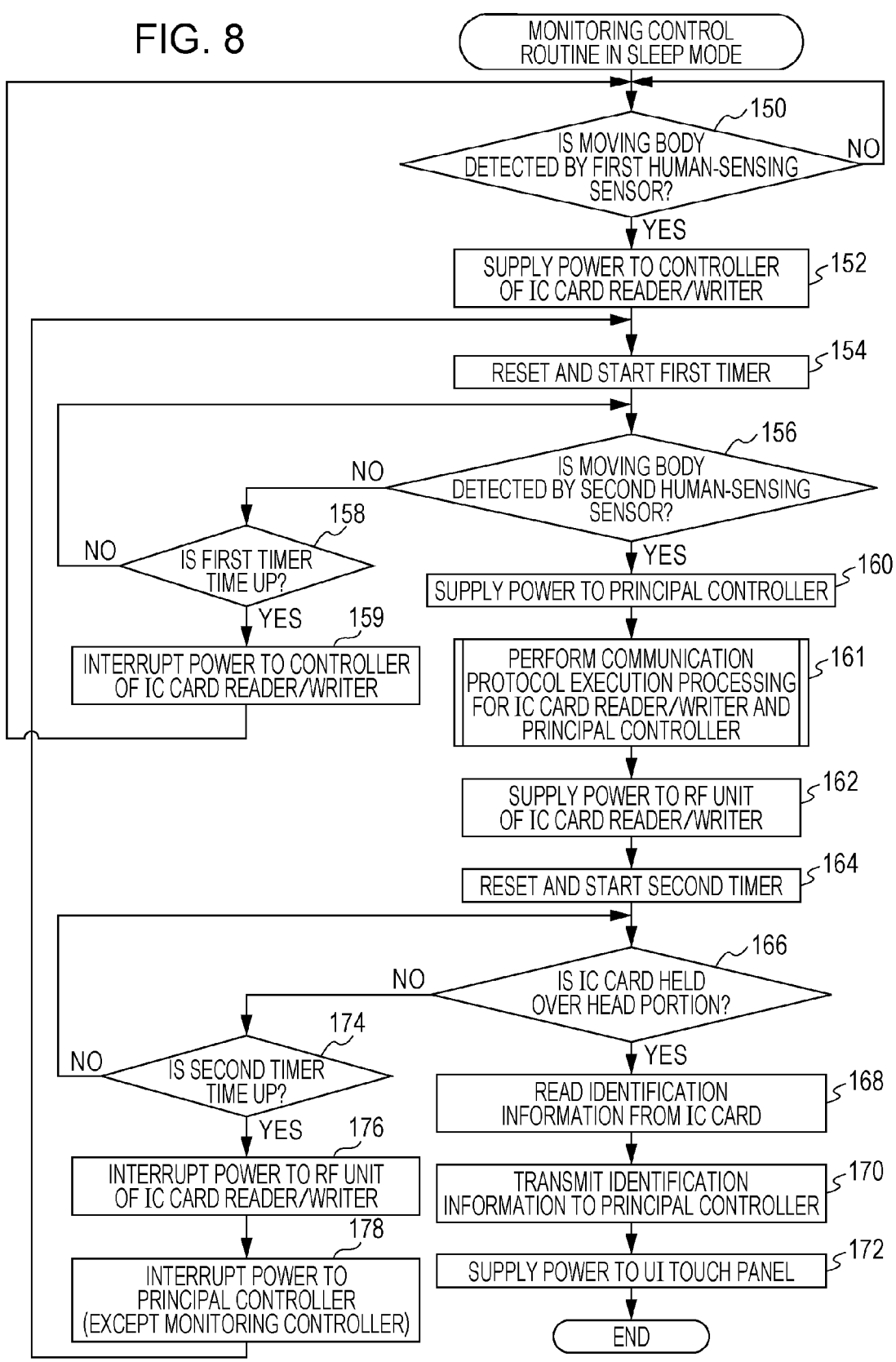
FIG. 8 is a flowchart illustrating a monitoring control routine in a sleep mode in a second exemplary embodiment.

FIG. 8 is a flowchart illustrating the flow of the process of power supply control in the second exemplary embodiment from the sleep mode to power supply to the principal controller 18 and then to power supply to the UI touch panel 40.

In step 150, it is determined whether or not a moving body is detected by the first human-sensing sensor 28. In the case where an affirmative determination is made, the process proceeds to step 152, in which power is supplied to the controller 64 of the IC card reader/writer 58. That is, power is not supplied to the RF unit 66.

In step 154, a first timer is reset and started. For example, a clock function of the controller 64 of the IC card reader/writer 58 may be applied to the first timer.

In step 156, it is determined whether or not the moving body (user 60) is detected by the second human-sensing sensor 30. In the case where a negative determination is made in step 156, the process proceeds to step 158, in which it is determined whether or not the first timer is time up. In the case where a negative determination is made in both steps 156 and 158, processing in steps 156 and 158 is repeated until an affirmative determination is made in any of steps 156 and 158.

Here, in the case where an affirmative determination is made in step 158, it is determined that, for example, the moving body detected by the first human-sensing sensor 28 has passed by the image processing apparatus 10 (it is determined that the detected moving body is not the user 60). Then, the process proceeds to step 159.

In step 159, power supply to the controller 64 of the IC card reader/writer 58 is interrupted (originally, power is not supplied to the controller 64). Then, the process returns to step 150 to return to the initial state of the sleep mode and repeat the processing steps described above. Here, power continues to be supplied to the monitoring controller 18A of the principal controller 18.

Meanwhile, in the case where it is determined that an affirmative determination is made in step 156, it is determined that the user 60 approaches the IC card reader/writer 58 in order to use the image processing apparatus 10. Then, the process proceeds to step 160, in which power is supplied in such a manner that all the functions of the principal controller 18, in which only the monitoring controller 18A is operating, are capable of operating. Then, the process proceeds to step 161.

In step 161, processing for establishing a communication protocol is performed in such a manner that transmission and reception of identification information to and from the IC card reader/writer 58 and the principal controller 18 is capable of being performed. Then, the process proceeds to step 162, in which power is supplied to the RF unit 66 of the IC card reader/writer 58. Then, the process proceeds to step 164.

In step 164, a second timer is reset and started. For example, a clock function of the controller 64 of the IC card reader/writer 58 or a clock function of the principal controller 18 may be applied to the second timer.

In step 166, it is determined whether or not the IC card 62 is "held over" the head portion 68 of the IC card reader/writer 58. In the case where an affirmative determination is made in step 166, it is determined that the user intends to receive authentication of the IC card 62. Then, the process proceeds to step 168, in which identification information is read from the IC card 62. Then, in step 170, the read identification information is transmitted to the principal controller 18, and the process proceeds to step 172.

In step 172, power is supplied to the UI touch panel 40, and the monitoring control routine in the sleep mode is terminated.

Here, the time when the IC card 62 is held over the head portion 68 of the IC card reader/writer 58 and the time when the user 60 is detected by the second human-sensing sensor 30 may be the same. However, depending on the relative positional relationship between the direction of the detection region by the second human-sensing sensor 30 (the second region N illustrated in FIGS. 3 and 4) and the installation position of the IC card reader/writer 58, the time when the IC card 62 is held over the head portion 68 of the IC card reader/writer 58 may not be the same as the time when the user 60 is detected by the second human-sensing sensor 30.

Furthermore, in the case where a negative determination is made in step 166, the process proceeds to step 174, in which it is determined that the second timer is time up. In the case where a negative determination is made in both steps 166 and 174, processing in steps 166 and 174 is repeated until an affirmative determination is made in any of steps 166 and 174.

Here, in the case where an affirmative determination is made in step 174, it is determined that the moving body has approached the image processing apparatus 10 but an operation for holding the IC card 62 over the IC card reader/writer 58 has not been performed, that is, for example, it is determined that the moving body is an unauthenticated person or the moving body is a person who has stopped using the image processing apparatus 10. Then, the process proceeds to step 176.

In step 176, power supply to the RF unit 66 of the IC card reader/writer 58 is interrupted. Then, in step 178, power supply to the principal controller 18 is interrupted. Then, the process returns to step 154 to repeat the processing steps described above. Here, power continues to be supplied to the monitoring controller 18A of the principal controller 18.

Modifications

Hereinafter, modifications of the first exemplary embodiment and the second exemplary embodiment will be described.

First Modification

After the IC card 62 is held over the head portion 68 of the IC card reader/writer 58, identification information is read from the IC card 62, and authentication is performed by the principal controller 18, power supply to the RF unit 66 is interrupted while a user is operating the UI touch panel 40 or during job processing. Alternatively, power supply to the RF unit 66 is performed intermittently.

Second Modification

In the first modification, in the case where cancellation of authentication is performed by operation on the UI touch panel 40, in the case where operation on the UI touch panel 40 is not performed even after a specific period of time has passed, when a job is completed, when image processing itself is not performed, or when authentication processing by a different user may be performed, power supply to the IC card reader/writer 58 continues to be performed.

Third Modification

Immediately after detection of a user is not performed by the second human-sensing sensor 30 or after a specific period of time has passed, power supply to at least the RF unit 66 of the IC card reader/writer 58 is interrupted. In this case, in the case where a user is detected by the second human-sensing sensor 30, power is supplied to the RF unit 66.

Fourth Modification

Immediately after detection of a moving body (user) is not performed by the first human-sensing sensor 28 or after a specific period of time has passed, power supply to the controller 64 and the RF unit 66 of the IC card reader/writer 58 is interrupted. In this case, since the detection conditions of the second human-sensing sensor 30 is not in issue, a stationary user may stand near the image processing apparatus 10 (face the UI touch panel 40). In such a case, since this user is highly likely to be authenticated, it may be determined that the user does not use the IC card reader/writer 58.

Fifth Modification

Immediately after detection of a user is not performed by the first human-sensing sensor 28 and the second human-sensing sensor 30 or after a specific period of time has passed, power supply to the controller 64 and the RF unit 66 of the IC card reader/writer 58 is interrupted. In this case, if a user is detected by the second human-sensing sensor 30, power is supplied to the RF unit 66.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power supply control device comprising:
   a monitoring controller that controls, in a cooperative manner, a processor that receives power supply and performs specific processing, an interface part that has a function of receiving operation instruction information, and an identification information acquisition part that acquires identification information for identifying a user in accordance with an authentication medium;
   a moving body detector that detects whether or not a moving body including the user exists within a specific region; and
   a power supply controller that individually allows objects, including the processor, the interface part, the identification information acquisition part, and the monitoring controller, to be controlled to enter a power supply state or a power interruption state in an independent manner, and in accordance with detection information output by the moving body detector, first controls the identification information acquisition part to be shifted from the power interruption state to the power supply state in a case where all the objects to be controlled are in the power interruption state,
   wherein the moving body detector includes a plurality of moving body detectors having different detection threshold distances,
   wherein at the time when the moving body is detected by one of the moving body detectors having a relatively longer detection threshold distance, the power supply controller causes the identification information acquisition part and the monitoring controller to enter the power supply state, and
   wherein in response to the monitoring controller authenticating the identification information acquired by the identification information acquisition part and the moving body is detected by another one of the moving body detectors having a relatively shorter detection threshold distance, the power supply controller causes the interface part to enter the power supply state.

2. The power supply control device according to claim 1, wherein the identification information acquisition part includes
   an identification information transmission/reception controller that executes, at the time when power supply starts, a function establishing program for establishing a function relating to communication of the identification information with the monitoring controller and maintains, after the function is established, a standby state in which the identification information is capable of being transmitted and received, and
   an identification information reader including a head portion that the authentication medium faces in a contact state or in a non-contact state, the identification information reader reading at least the identification information stored in the authentication medium when the authentication medium faces the head portion, and
   wherein power is capable of being individually supplied to the identification information transmission/reception controller and the identification information reader in an independent manner.

3. The power supply control device according to claim 2,
   wherein the moving body detector includes a plurality of moving body detectors having different detection threshold distances,
   wherein the power supply controller starts the function establishing program to establish the function relating to the communication of the identification information with the monitoring controller by causing the identification information transmission/reception controller of the identification information acquisition part to enter the power supply state at the time when the moving body is detected by one of the moving body detectors having a relatively longer detection threshold distance,
   wherein the power supply controller allows the identification information stored in the authentication medium to be read by causing the identification information reader of the identification information acquisition part to enter the power supply state at the time when the moving body is detected by another one of the moving body detectors having a relatively shorter detection threshold distance,
   wherein the power supply controller allows authentication processing based on the identification information to be performed by causing the monitoring controller to enter the power supply state at the time when the authentication medium comes to face the head portion, and wherein the power supply controller causes the interface part to enter the power supply state in response to the monitoring controller authenticating the identification information and the moving body is detected by the other moving body detector having the relatively shorter detection threshold distance.

4. An image processing apparatus comprising:

the power supply control device as set forth in claim 1, wherein the processor includes two or more processing sections from among (i) an image reading processing section that reads an image from a document image, (ii) an image forming processing section that forms an image on recording paper in accordance with image information, and (iii) a facsimile communication processing section that transmits and receives an image in accordance with a specific communication procedure, and wherein the power supply control device includes a partial power-saving unit that performs power saving by individually controlling, using the power supply controller, the two or more processing sections to enter the power supply state or the power interruption state in an independent manner.

5. An image processing apparatus comprising:

the power supply control device as set forth in claim 2, wherein the processor includes two or more processing sections from among (i) an image reading processing section that reads an image from a document image, (ii) an image forming processing section that forms an image on recording paper in accordance with image information, and (iii) a facsimile communication processing section that transmits and receives an image in accordance with a specific communication procedure, and wherein the power supply control device includes a partial power-saving unit that performs power saving by individually controlling, using the power supply controller, the two or more processing sections to enter the power supply state or the power interruption state in an independent manner.

6. An image processing apparatus comprising:

the power supply control device as set forth in claim 3, wherein the processor includes two or more processing sections from among (i) an image reading processing section that reads an image from a document image, (ii) an image forming processing section that forms an image on recording paper in accordance with image information, and (iii) a facsimile communication processing section that transmits and receives an image in accordance with a specific communication procedure, and wherein the power supply control device includes a partial power-saving unit that performs power saving by individually controlling, using the power supply controller, the two or more processing sections to enter the power supply state or the power interruption state in an independent manner.

7. A power supply control method comprising:

controlling, by a monitoring controller in a cooperative manner, a processor that receives power supply and performs specific processing, an interface part that has a function of receiving operation instruction information, and an identification information acquisition part that acquires identification information for identifying a user in accordance with an authentication medium;

detecting whether or not a moving body including the user exists within a specific region; and individually allowing objects, including the processor, the interface part, the identification information acquisition part, and the monitoring controller, to be controlled to enter a power supply state or a power interruption state in an independent manner, and in accordance with the detecting, first controlling the identification information acquisition part to be shifted from the power interruption state to the power supply state in a case where all the objects to be controlled are in the power interruption state, wherein the detecting comprises detecting using a plurality of moving body detectors having different detection threshold distances, and in the individually allowing the objects to be controlled to enter the power supply state or the power interruption state in the independent manner, the identification information acquisition part and the monitoring controller are caused to enter the power supply state at the time when the moving body is detected by one of the moving body detectors having a relatively longer detection threshold distance, and the interface part is caused to enter the power supply state in response to the monitoring controller authenticating the identification information acquired by the identification information acquisition part and the moving body is detected by another one of the moving body detectors having a relatively shorter detection threshold distance.

8. A non-transitory computer readable medium storing a program causing a computer to execute a process for controlling power supply, the process comprising:

controlling, by a monitoring controller in a cooperative manner, a processor that receives power supply and performs specific processing, an interface part that has a function of receiving operation instruction information, and an identification information acquisition part that acquires identification information for identifying a user in accordance with an authentication medium;

detecting whether or not a moving body including the user exists within a specific region; and individually allowing objects, including the processor, the interface part, the identification information acquisition part, and the monitoring controller to be controlled to enter a power supply state or a power interruption state in an independent manner, and in accordance with the detecting, first causing the identification information acquisition part to be shifted from the power interruption state to the power supply state in a case where all the objects to be controlled are in the power interruption state, wherein the detecting comprises detecting using a plurality of moving body detectors having different detection threshold distances, and in the individually allowing the objects to be controlled to enter the power supply state or the power interruption state in the independent manner, the identification information acquisition part and the monitoring controller are caused to enter the power supply state at the time when the moving body is detected by one of the moving body detectors having a relatively longer detection threshold distance, and the interface part is caused to enter the power supply state in response to the monitoring controller authenticating the identification information acquired by the identification information acquisition part and the moving body is detected by another one of the moving body detectors having a relatively shorter detection threshold distance.

9. The non-transitory computer readable medium according to claim 8,
wherein the identification information acquisition part includes an identification information transmission/reception controller and an identification information reader, the identification information transmission/reception controller executing a function establishing program for establishing a function relating to communication of the identification information with the monitoring controller at the time when power supply starts and maintaining a standby state in which the identification information is capable of being transmitted and received after the function is established, the identification information reader including a head portion that the authentication medium faces in a contact state or a non-contact state, the identification information reader reading at least the identification information stored in the authentication medium when the authentication medium faces the head portion, and power is capable of being individually supplied to the identification information transmission/reception controller and the identification information reader in an independent manner, and wherein in the individually allowing the objects to be controlled to enter the power supply state or the power interruption state in the independent manner, the function establishing program is started and the function relating to the communication of the identification information with the monitoring controller is established by causing the identification information transmission/reception controller of the identification information acquisition part to enter the power supply state at the time when the moving body is detected by one of the moving body detectors having a relatively longer detection threshold distance, the identification information stored in the authentication medium is capable of being read by causing the identification information reader of the identification information acquisition part to enter the power supply state at the time when the moving body is detected by another one of the moving body detectors having a relatively shorter detection threshold distance, authentication processing based on the identification information is capable of being performed by causing the monitoring controller to enter the power supply state at the time when the authentication medium comes to face the head portion, and the interface part is caused to enter the power supply state in response to the monitoring controller authenticating the identification information and the moving body is detected by the other moving body detector having the relatively shorter detection threshold distance.

* * * * *